United States Patent [19]

Reams

[11] Patent Number: 5,826,045
[45] Date of Patent: Oct. 20, 1998

[54] ARBITRATION PARKING APPARATUS AND METHOD FOR A SPLIT TRANSACTION BUS IN A MULTIPROCESSOR COMPUTER SYSTEM

[75] Inventor: Byron L. Reams, Lexington, S.C.

[73] Assignee: NCR Corporation, Dayton, Ohio

[21] Appl. No.: 570,452

[22] Filed: Dec. 11, 1995

[51] Int. Cl.[6] .................................................. G06F 13/36
[52] U.S. Cl. ......................... 395/287; 395/728; 395/293
[58] Field of Search .................... 395/287, 293, 395/294, 296, 729, 200.06, 800, 728

[56] References Cited

U.S. PATENT DOCUMENTS

| | | | |
|---|---|---|---|
| 3,997,896 | 12/1976 | Cassarino, Jr. et al. | 395/294 |
| 4,783,730 | 11/1988 | Fischer | 395/825 |
| 4,785,394 | 11/1988 | Fischer | 395/294 |
| 4,896,256 | 1/1990 | Roberts | 395/309 |
| 4,924,380 | 5/1990 | McKinney et al. | 395/291 |
| 4,941,088 | 7/1990 | Shaffer et al. | 711/121 |
| 5,006,982 | 4/1991 | Ebersole et al. | 395/736 |
| 5,088,024 | 2/1992 | Vernon et al. | 395/291 |
| 5,193,149 | 3/1993 | Awiszio et al. | 395/200.8 |
| 5,253,348 | 10/1993 | Scalise | 395/293 |
| 5,274,787 | 12/1993 | Hirano et al. | 711/143 |
| 5,280,591 | 1/1994 | Garcia et al. | 395/291 |
| 5,301,282 | 4/1994 | Amini et al. | 395/293 |
| 5,546,546 | 8/1996 | Bell et al. | 395/292 |
| 5,546,547 | 8/1996 | Bowes et al. | 395/294 |
| 5,550,988 | 8/1996 | Sarangdhar et al. | 395/293 |
| 5,581,782 | 12/1996 | Sarangdhar et al. | 395/800 |
| 5,592,631 | 1/1997 | Kelly et al. | 395/293 |
| 5,596,729 | 1/1997 | Lester et al. | 395/308 |

Primary Examiner—Gopal C. Ray
Attorney, Agent, or Firm—Charlene Stukenborg

[57] ABSTRACT

An arbitration parking apparatus and method for a split transaction bus is provided. Processor agent(s) and memory agent(s) are connected by a split transaction bus which includes an arbiter to control access to the split transaction bus. The arbitration parking scheme includes parking a memory agent if there is an outstanding request. If there is no outstanding request and neither a processor nor memory agent request, then the arbiter parks either a memory agent or a processor agent depending on system characteristics. By parking the agent to request access to the split transaction bus next, arbitration overhead is reduced.

13 Claims, 6 Drawing Sheets

ARBITRATION PARKING APPARATUS AND METHOD FOR A SPLIT TRANSACTION BUS IN A MULTIPROCESSOR COMPUTER SYSTEM

BACKGROUND OF THE INVENTION

The present invention relates generally to multiprocessor data processing systems and, in particular, to an arbitration parking apparatus and method for a multiprocessor system using a split transaction bus.

In a computer system, agents such as processors, memory devices, input/output devices and other peripheral devices are connected by a bus which carries electrical signals between the agents. Although several agents may request use of a bus, only one agent may use the bus at a time. Therefore arbitration schemes have been developed to determine which agent will be granted control of the bus.

One such arbitration technique is a fair arbitration technique. When multiple agents simultaneously request a bus, a fair arbitration technique usually causes some overhead in selecting which single agent should be the next to use the bus. When using arbitration fairness, all requests from agents arriving during any given cycle are handled, based on a fair method of establishing priorities, before any requests from agents arriving during subsequent cycles. The overhead time in selecting the single agent to use the resource is generally called arbitration overhead. To minimize this overhead, a fair arbitration scheme generally provides for parking one of the agents.

By parking an agent, that agent becomes the default owner of the arbitrated resource. If the parked agent is the next agent to request the resource, the overhead associated with fair arbitration is not incurred when the parked agent assumes bus ownership. Thus, overhead time is reduced. In a system with x agents, FIG. 1A shows a timing diagram of an arbitration system when the requesting unit is not parked. (Note: all signals in FIGS. 1A and 1B are active-high. For example only, a high signal may indicate a signal level of 5 volts.) To gain control of the bus, the requesting agent (x) must set the PREQ(x) signal. Then the arbiter sets a PACK (x) signal for the agent that is granted bus ownership when the bus is free. Then the requesting agent(x) starts a cycle by asserting the ADS signal. This sequence takes, at a minimum, two clock cycles. FIG. 1B shows a timing diagram of an arbitration system when the requesting agent is parked. Because the requesting agent (x) is parked, the PACK(x) signal remains set (high). The requesting agent(x) can immediately start the cycle as soon as it asserts its request PREQ(x), saving at least two clock cycles of arbitration.

A traditional arbitration scheme provides that the highest probability agent is the last agent to request the bus. Therefore, that agent becomes the parked agent if no other requests are present.

However, in a split transaction bus, each operation (read or write) requires two transactions, a request transaction and a reply transaction. During the request transaction the operation address is transferred from the initiator to the responder. If the operation is a write operation, the write data is also transferred during the request transaction. After completion of the request transaction the initiator releases the bus for use by other agents. Between the request transaction and the reply transaction the responder will perform the actions necessary to complete the operation (fetch requested data for reads, or write data for writes). When the responder is ready it will request use of the bus for the reply transaction. During the reply transaction the responder indicates to the initiator that the operation is complete. If the operation is a read operation, the requested data is transferred from the responder to the initiator. Since the responder must request use of the bus for the reply transaction before the initiator can start another operation, the initiator will have zero probability of generating the next arbitration request. Therefore, parking the initiator, as directed by a traditional arbitration parking scheme, unnecessarily increases overhead time.

There is a need for an arbitration parking scheme for a split transaction bus which provides flexibility and reduces arbitration overhead time.

SUMMARY OF THE INVENTION

In accordance with the teachings of the present invention, an arbitration parking scheme for a split transaction bus having a central arbiter is provided.

It is accordingly an object of the present invention to provide an arbitration parking apparatus and method for a split transaction bus having multiple processor/cache agents and multiple memory agents wherein the memory agents only respond to processor requests and do not generally request bus ownership.

It is accordingly an object of the present invention to provide an arbitration parking apparatus and method for a split transaction bus having multiple processor/cache agents and multiple memory agents in which directory-based cache coherency is maintained in the shared memory or interface to other buses occurs so that the memory agents do generally request bus ownership.

It is another object of the present invention to provide an arbitration parking scheme which reduces the amount of arbitration time required in a split transaction bus multiprocessor system having a central arbiter, thus increasing system performance while still maintaining a flexible system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 2:
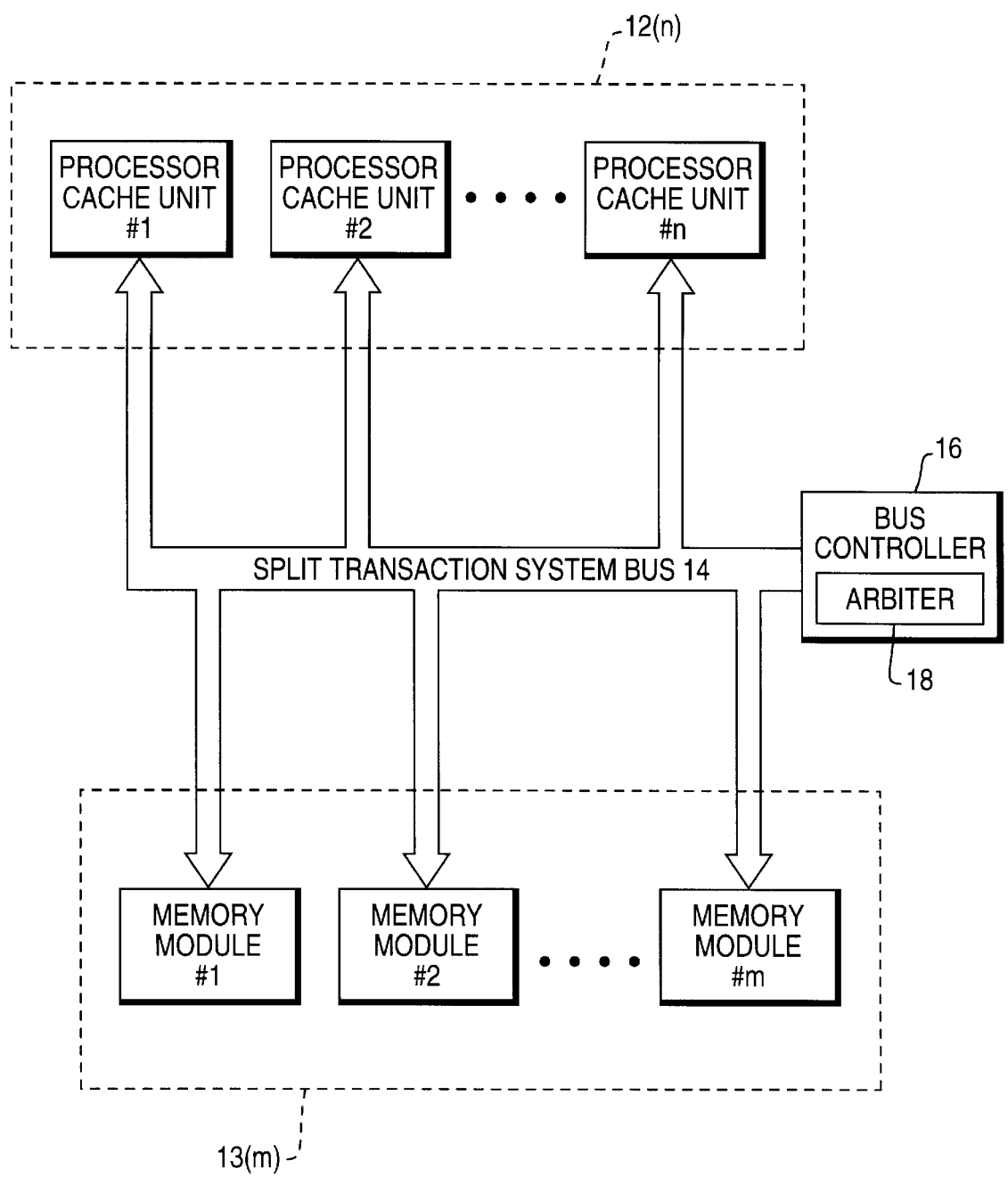
FIG. 2 is a block diagram of a typical multiprocessor system with a split transaction bus in which a first embodiment of the present invention is used.

Referring now to the drawings, in which like-referenced characters indicate corresponding elements throughout the several views, attention is first drawn to FIG. 2 which shows a system including a plurality of processor bus agents 12(n), a plurality of memory agents 13(m) and a split transaction system bus 14 in which a first embodiment of this invention is used (where n indicates the number of processor bus agents and m indicates the number of memory bus agents).

Processor bus agents 12(n) may include combinations of processors and cache and other peripheral devices. Memory agents 13(m) may be single memory devices. These memory agents typically do not request bus ownership except to respond to processor requests such as to provide information to fulfill a READ or WRITE request.

Split transaction system bus 14 connects processor bus agents 12(n) and memory agents 13(m). Split transaction system bus 14 has a bus controller 16 having a central arbiter 18. (Either n or m could be 1, indicating only a single processor agent or memory agent is associated with the bus system.)

Figure 4:
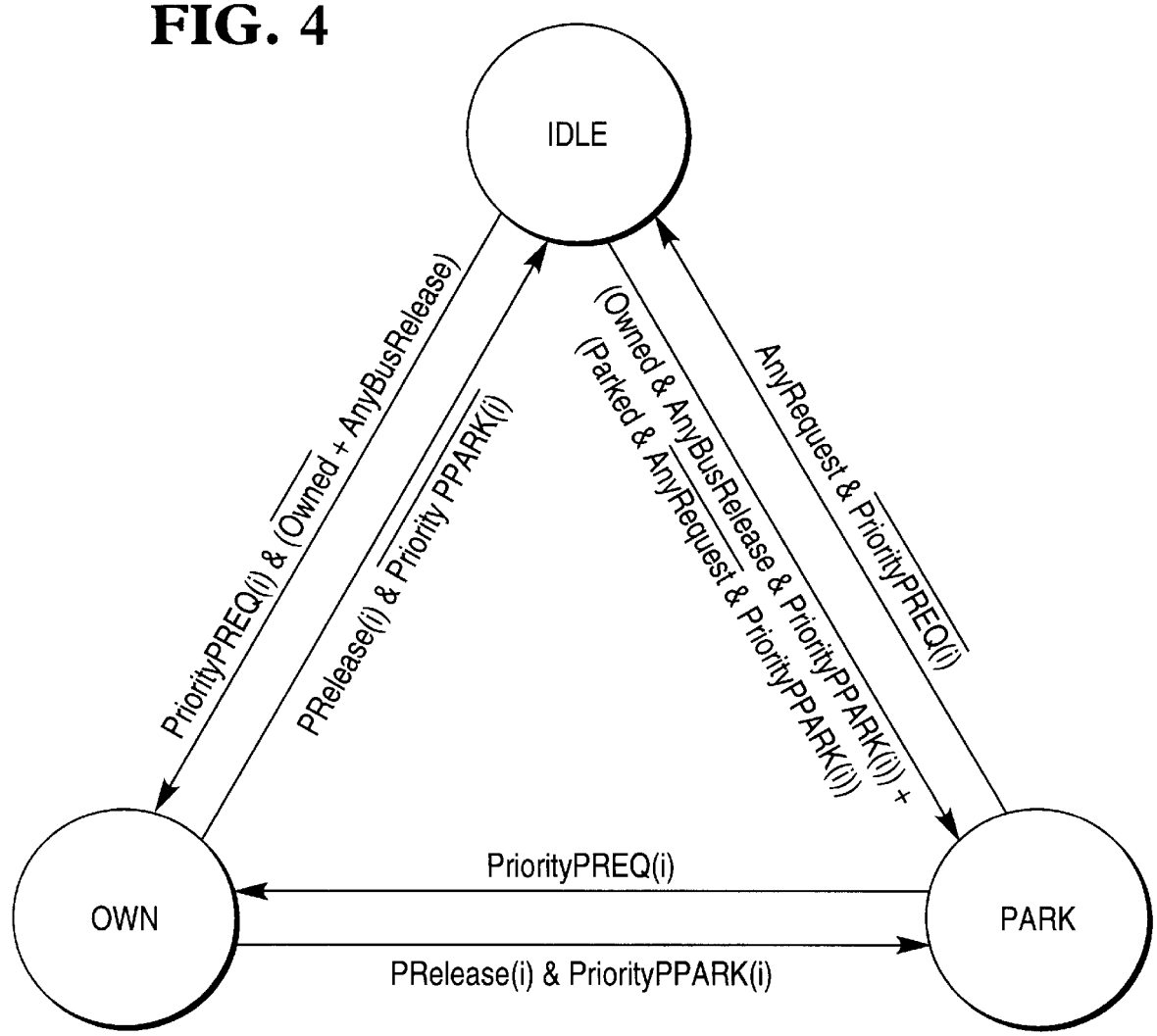
FIG. 4 shows a processor agent state machine associated with a first embodiment of the present invention.
Figure 5:
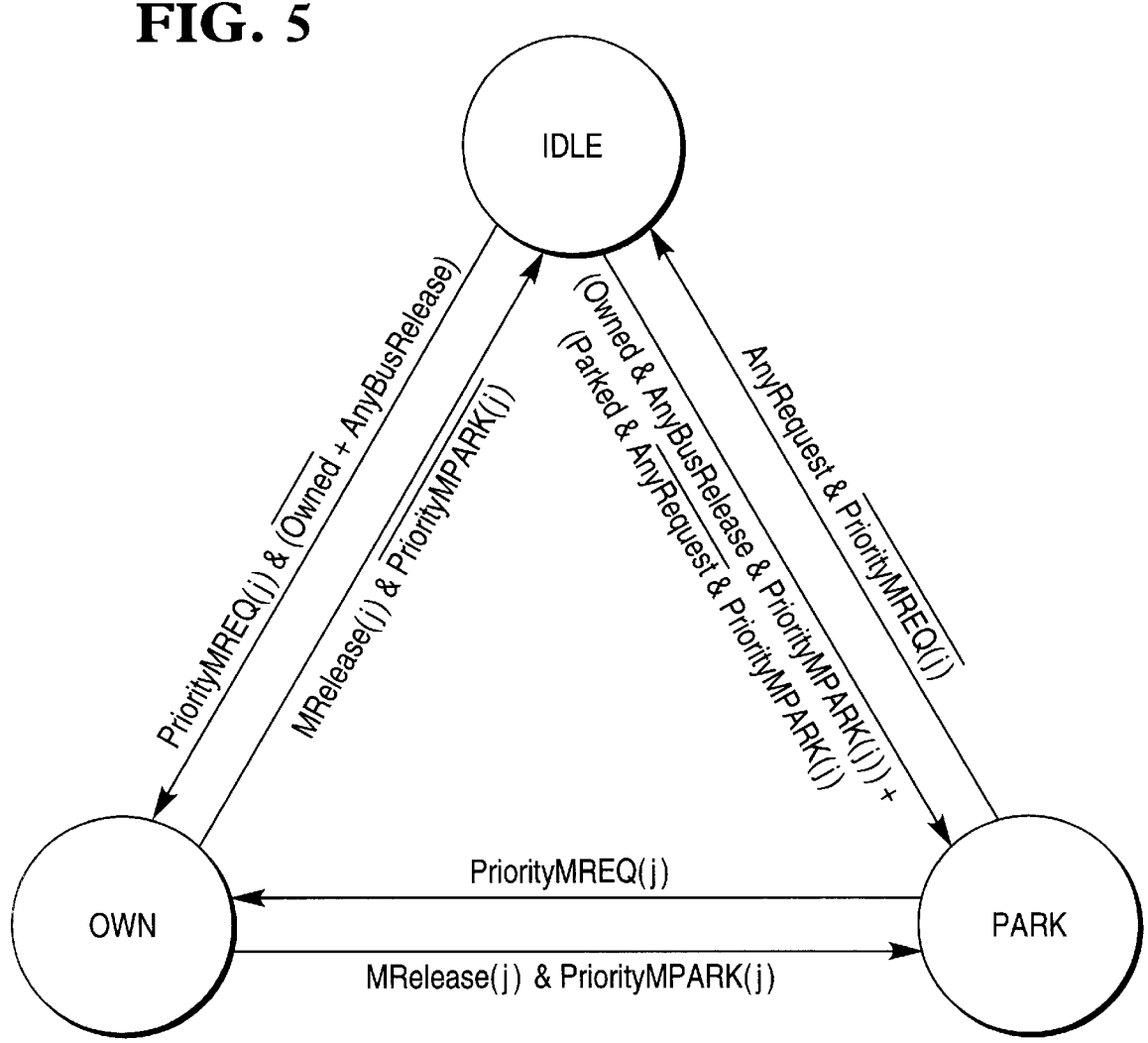
FIG. 5 shows a memory agent state machine associated with a first and a second embodiment of the present invention.

Now turning to the operation of the system and method, a general overview is first provided. Following the general overview, a detailed discussion of the figures and related signals is provided. The arbiter 18 tracks the current state of arbitration according to the diagram shown in FIG. 3. The arbiter 18 also has a state machine for each agent as shown in FIGS. 4 and 5 for tracking which state each individual agent is in. The arbiter 18 also contains logic for receiving signals and generating signals which may cause transitions in the state machines of FIGS. 3, 4 and 5.

Figure 3:
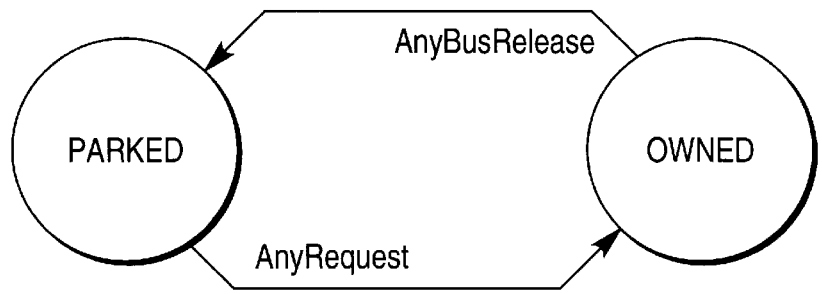
FIG. 3 shows a state machine for tracking the current state of arbitration within the arbiter.

Referring to FIG. 3 in more detail, the arbiter 18 determines the current state of arbitration within the arbiter 18, There are two states: Owned and Parked. Only one agent can be parked or own the bus for any bus cycle. When the arbiter 18 receives a request to own the bus, the current state of arbitration within the arbiter transitions from the Parked state to the Owned state. This is indicated on the diagram by the AnyRequest signal which is set according to the following logic:

$$\text{AnyRequest} = \sum_{i=1}^{n} PREQ(i) + \sum_{j=1}^{m} MREQ(j)$$

(where "+" indicates a logical OR throughout this discussion, where "&" indicates a logical AND throughout this discussion, where "—" indicates a logical NOT throughout this discussion)

When an agent has the bus in the Owned state, the arbiter 18 remains in the Owned state until that agent has released the bus. This is indicated on the diagram by the AnyBusRelease signal which is set according to the following logic:

$$\text{AnyBusRelease} = \overline{LOCK} \ \& \ \text{Any} ACK \ \& \ \overline{\text{AnyRequest}}$$

$$\text{Any} ACK = \sum_{i=1}^{n} PACK(i) + \sum_{j=1}^{m} MACK(j)$$

The arbiter 18 transitions from the Owned state to the Parked state when an agent releases the bus by not requesting to own the bus or by not setting a LOCK signal which is well-known in the art to enable an agent to retain control of the bus for more than one transaction. (As used in the above discussion, REQ and ACK signals represent standard signals commonly used in arbitration schemes.)

In order to determine the overall state of the bus as indicated by the state machine of FIG. 3, the arbiter 18 also includes state machines for each individual bus agent. FIG. 4 shows a processor agent state machine. A processor agent state machine exists for each processor agent 12(n) which arbitrates for bus ownership in the arbiter 18. FIG. 5 shows a memory agent state machine. A memory agent state machine exists for each memory agent 13(m) which arbitrates for bus ownership in the arbiter 18. Each bus agent state machine has three states: Idle, Own and Park. The (i) and (j) indicate each individual agent's signals, so (i)=(1, 2, ..., n) for each processor agent 12(n) and (j)=(1, 2, ..., m) for each memory agent 13(m).

If an agent is not parked on the bus and is not the current bus owner, then it is in the Idle state. When an agent asserts an arbitration request, has the highest priority as indicated by PriorityPREQ or PriorityMREQ, and is granted bus ownership, it transitions to the Own state. The Park state indicates that the agent is parked on the bus but is not actually requesting ownership of the bus. On every clock cycle exactly one agent must be in the Own or Park state, while all other agents are in the Idle state. When an agent is in the Park or Own state, the arbiter sets that agent's ACK signal high (either PACK(i) or MACK(j)). An agent may maintain ownership for more than one transaction by setting a LOCK signal. The following table indicates which signals are required for each transition: Processor Agents (i=1, 2, ..., n)

| | |
|---|---|
| Idle --> Own | PriorityPREQ(i) & (Owned + AnyBusRelease) |
| Idle --> Park | (Owned & AnyBusRelease & PriorityPPARK(i)) + (Parked & AnyRequest & PriorityPPARK(i)) |
| Park --> Own | PriorityPREQ(i) |
| Park --> Idle | AnyRequest & PriorityPREQ(i) |
| Own --> Idle | PRelease(i) & PriorityPPARK(i) |
| Own --> Park | PRelease(i) & PriorityPPARK(i) | where
  Parked=Arbiter State (FIG. 3) is Parked
  Owned=Arbiter State (FIG. 3) is Owned
  PriorityPREQ(i) (see discussion of FIG. 6 below)
  PriorityPPARK(i) (see discussion of FIG. 6 below)
  AnyRequest (see discussion of FIG. 3 above)
  PRelease(i)=PACK(i) & $\overline{PREQ(i)}$ & $\overline{LOCK}$
  PACK(i) is set by the arbiter when processor agent(i) is parked or owns the bus.
  Memory Agents (j=1, 2, ..., m)

| | |
|---|---|
| Idle --> Own | PriorityMREQ(j) & (Owned + AnyBusRelease) |
| Idle --> Park | (Owned & AnyBusRelease & PriorityMPARK(j)) + (Parked & AnyRequest & PriorityMPARK(j)) |
| Park --> Own | PriorityMREQ(j) |
| Park --> Idle | AnyRequest & PriorityMREQ(j) |
| Own --> Idle | MRelease(j) & PriorityMPARK(j) |
| Own --> Park | MRelease(j) & PriorityMPARK(j) | where
  Parked=Arbiter State (FIG. 3) is Parked
  Owned=Arbiter State (FIG. 3) is Owned
  PriorityMREQ(j) (see discussion of FIG. 6 below)
  PriorityMPARK(j) (see discussion of FIG. 6 below)
  AnyRequest (see discussion of FIG. 3 above)

PRelease(j)=PACK(j) & $\overline{\text{PREQ(j)}}$ & $\overline{\text{LOCK}}$

MACK(j) is set by the arbiter when memory agent(i) is parked or owns the bus.

Figure 6:
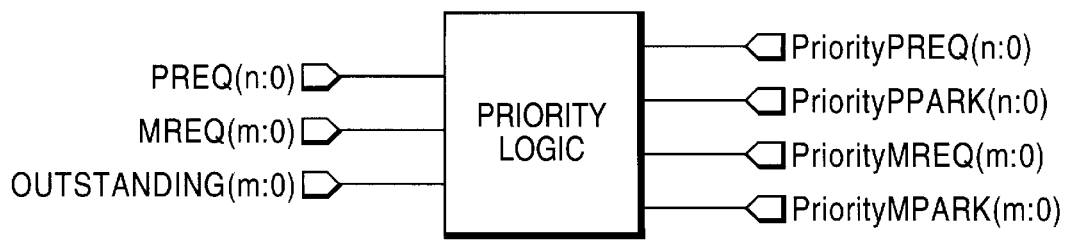
FIG. 6 is a block diagram showing a PriorityLogic device associated with a first embodiment of the present invention.
Figure 7:
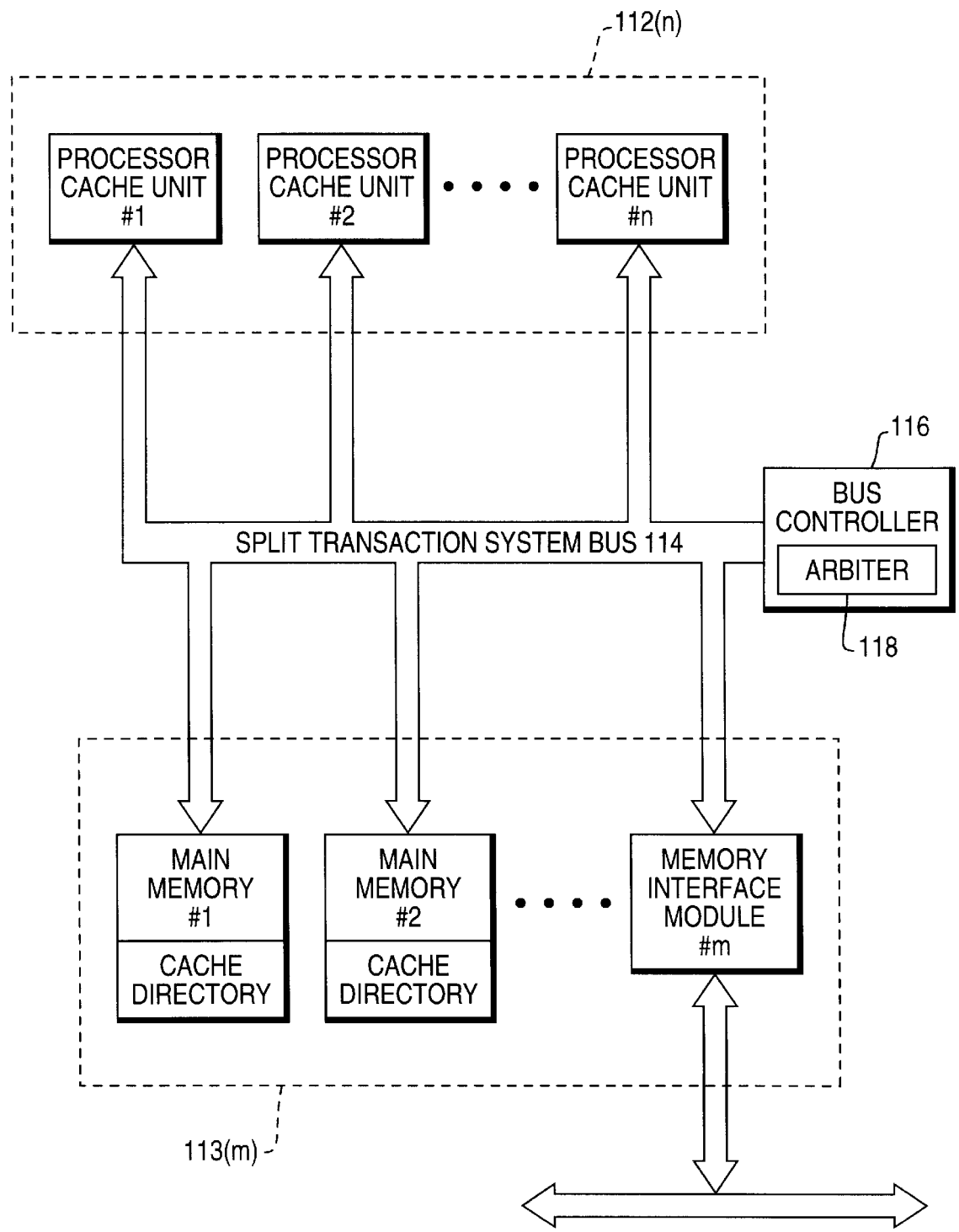
FIG. 7 is a block diagram of a typical multiprocessor system with a split transaction bus in which a second embodiment of the present invention is used.

FIG. 6 shows a block diagram of a logic device called PriorityLogic used to determine which agent is either parked or owns the bus according to the present invention. PriorityLogic receives input signals PREQ(n:0), MREQ(m:0) and OUTSTANDING(m:0) and generates output signals PriorityPREQ(n:0), PriorityPPARK(n:0), PriorityMREQ(m:0) and PriorityMPARK(m:0). Processor request (PREQ(n:0)) indicates that a processor agent(n) is requesting bus access and indicates which processor agent 12(n). OUTSTANDING(m:0) indicates that there is either a READ or WRITE operation indicates that there is either a READ or WRITE operation awaiting completion and indicates the targeted memory agent 13(m) that will request the bus for a reply transaction. Memory Request (MREQ(m:0)) indicates if a memory agent is requesting bus access and indicates which memory agent 13(m). In the present embodiment, memory agents 13(m) are the type that generally do not request bus access, so MREQ(m:0) will rarely be set, except when a memory agent requests bus access in order to perform a reply transaction (OUTSTANDING signal set) to fulfill a READ or WRITE operation. Each of the input signals is comprised of a plurality of input signals. For example, PREQ(n:0) includes PREQ(1), PREQ(2), . . . , PREQ(n).

PriorityLogic generates output signals PriorityPREQ(n:0), PriorityPPARK(n:0), PriorityMREQ(m:0), and PriorityMPARK(m:0) depending on the input signals received. If either a single processor or a single memory agent requests access to the bus, then the arbiter 18 grants ownership of the bus to the requesting agent (either PriorityPREQ or PriorityMREQ signal set). If there is more than one requesting agent, the arbiter 18 may use any arbitration scheme to grant ownership to exactly one of the requesting agents. There are many known systems for establishing priority among requesting bus agents, such as fixed, round robin, or pseudo-random, and the arbiter 18 may use any scheme based on the particular system characteristics to optimize system performance.

Figure 1A:
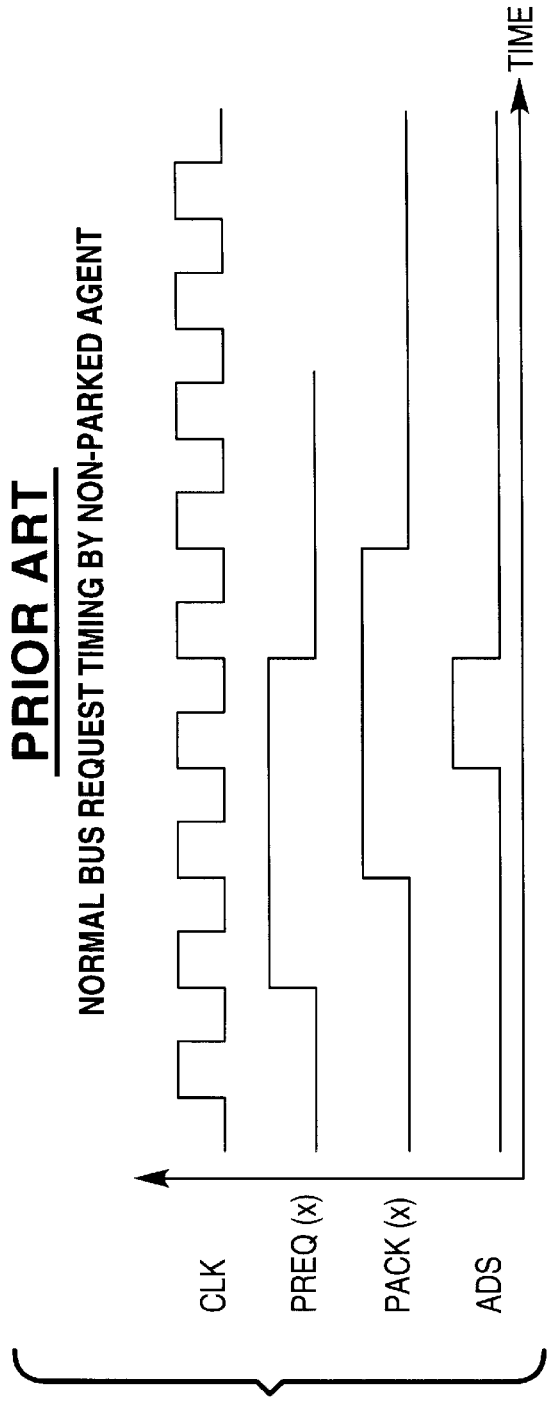
FIG. 1A shows a timing diagram of an arbitration system when the requesting agent is not the parked agent.
Figure 1B:
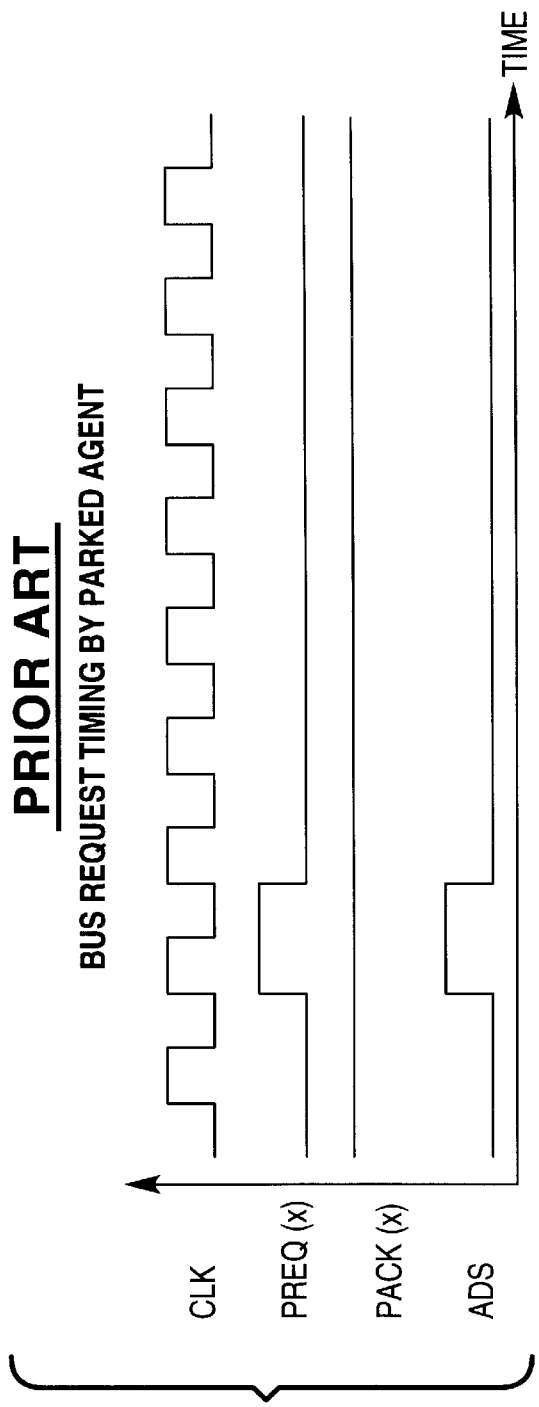
FIG. 1B shows a timing diagram of an arbitration system when the requesting agent is the parked agent.

If PriorityLogic receives one input to set the OUTSTANDING signal, then the arbiter 18 parks that targeted memory agent as there is a high likelihood that this particular memory agent 13(m) will be the next agent to request ownership of the bus in order to respond with the requested information (PriorityMPARK signal set). If PriorityLogic receives multiple inputs to set the OUTSTANDING signal, then the arbiter 18 parks exactly one of the memory agents 13(m) (PriorityMPARK signal set). The arbiter 18 may use any scheme to select the one agent to park, based on system characteristics. Since this embodiment of the present invention includes memory agents which generally do not request bus access, if neither a processor or memory agent requests access to the bus and no memory agent is in the process of fulfilling an outstanding operation as indicated by the OUTSTANDING signal, then the arbiter 18 will select a processor agent 12(n) to park (PriorityPPARK signal set). The arbiter 18 may use any scheme to select the one agent to park, based on system characteristics. If the next agent requesting ownership of the bus is the parked agent, then arbitration overhead time is saved. (See FIGS. 1A and 1B).

In a second embodiment of the present invention, there are a plurality of processor agents 112(n), a split transaction bus 114, a bus controller 116, a central arbiter 118, and memory agents 113(m) with special purposes. (Either n or m could be 1, indicating only a single processor agent or memory agent is associated with the bus system.) The specialized memories may include memory which stores directory information for directory-based cache coherency or memory acting as a bridge to another bus. In contrast to the memory agents associated with the first embodiment, these memory agents associated with the second embodiment have an increased probability of generating an arbitration request independent of any outstanding operations. It is critical to reduce the latency for operations initiated by these memory agents as the initiated operations are on behalf of cache coherency traffic or remote operations through the memory, serving as a bridge, which have already incurred long latency.

Figure 8:
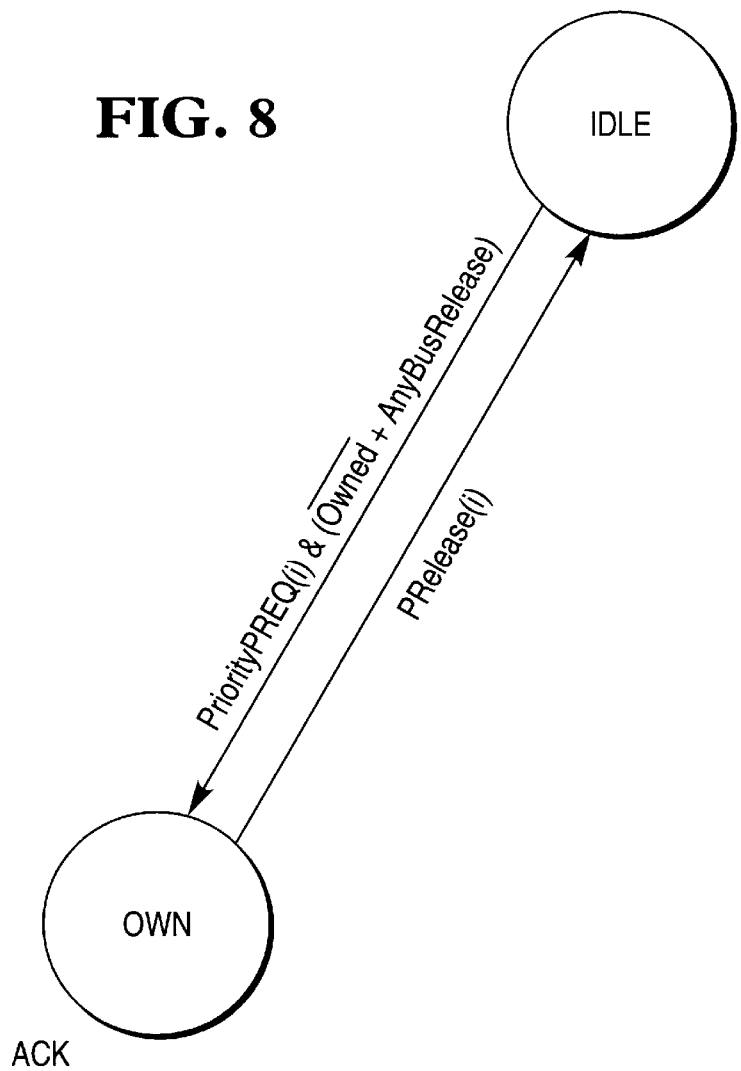
FIG. 8 shows a processor agent state machine associated with a second embodiment of the present invention.

In operation, the arbiter 118 determines the state of arbitration as shown in FIG. 3 and discussed above. Memory agent state machine is the same as that shown in FIG. 5 and uses the transitions as described above in relation to the first embodiment of the present invention. In this second embodiment of the present invention, the arbiter 118 does not park processor agents. Thus processor agent state machine, as shown in FIG. 8, only has two states: Own and Idle. The transitions between processor agent states occur as indicated below:

Processor Agents (i=1, 2, . . . , n)

| | |
|---|---|
| Idle --> Own | PriorityPREQ(i) & $\overline{\text{(Owned}}$ + AnyBusRelease) |
| Own --> Idle | PRelease(i) | where

Parked=Arbiter State (FIG. 3) is Parked

Owned=Arbiter State (FIG. 3) is Owned

PRelease(i)=PACK(i) & $\overline{\text{PREQ(i)}}$ & $\overline{\text{LOCK}}$

PACK(i) is set by the arbiter when processor agent(i) owns the bus.

PriorityPREQ(i) (see discussion of FIG. 9 below)

Figure 9:
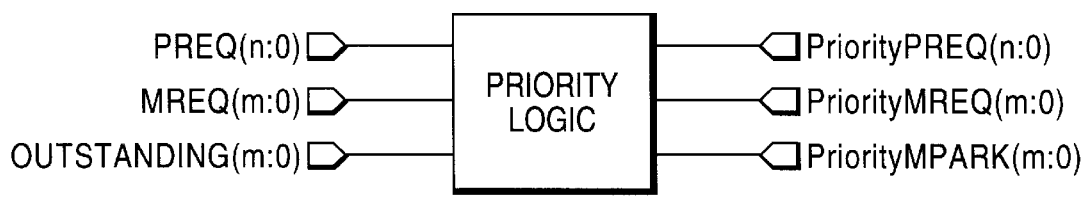
FIG. 9 is a block diagram showing a PriorityLogic device associated with a second embodiment of the present invention.

The logic device called PriorityLogic for a second embodiment is shown in FIG. 9. PriorityLogic receives the same inputs PREQ(n:0), MREQ(m:0) and OUTSTANDING(m:0) as same inputs PREQ(n:0), MREQ(m:0) and OUTSTANDING(m:0) as discussed above. PriorityLogic generates the following output signals: PriorityPREQ(n:0), PriorityMREQ(m:0) and PriorityMPARK(m:0). If either a processor or memory agent requests access to the bus, then the arbiter 118 grants ownership of the bus to the requesting agent (either PriorityPREQ or PriorityMREQ signal set). If there is more than one requesting agent, the arbiter 118 may use any arbitration scheme to grant ownership to one of the requesting agents. There are many known systems for establishing priority among requesting bus agents, such as fixed, round robin, or pseudo-random, and the arbiter 118 may use any scheme based on the particular system characteristics to optimize system performance It is noted that an active MREQ signal is much more likely since the memory agents generally will request bus access according to this embodiment of the present invention. There is also no PriorityPPARK output signal associated with this embodiment. This is because the memory agents 113(m) are likely to request access to the bus and also to respond to OUTSTANDING signals, so system performance increases by always (or continually) parking memory agents and never parking processor agents.

It will be noted that since this invention relates to the operation of the arbiter parking scheme, the system is flexible in that certain agents are not designated as only initiators or as only responders. Specifically, memory agents may be considered as initiators or responders depending on whether they are fulfilling an outstanding Read or Write request from another agent or initiating a request. Also, the schemes described above are designed according to the role of the memory agents to increase system performance based on system characteristics.

In conclusion, if the agent which requests bus ownership next is the parked agent, then time is saved. Otherwise regular arbitration must occur causing arbitration overhead. The above described embodiments attempt to predict and then park the "right" agent (the agent which will request the bus next). The ability to predict the "right" agent varies with system characteristics. Although the arbitration parking scheme of the present invention cannot accurately determine the agent to park such that the parked agent is always the next agent to request bus ownership, over the course of several transactions, the present invention saves time and increases throughput while still providing a flexible system.

Although the invention has been described with particular reference to certain preferred embodiments thereof, variations and modifications of the present invention can be effected within the spirit and scope of the following claims.

What is claimed is:

1. In a computer system comprising a plurality of processor and memory agents and a split transaction bus, a method of arbitration parking, comprising the steps of:

determining if there is an outstanding request on the split transaction bus;

determining if there is a requesting agent;

parking one of said plurality of memory agents if there is an outstanding request and there is not a requesting agent; and parking one of said plurality of processor agents if there is not an outstanding request and there is not a requesting agent;

wherein said memory agents do not generally request bus ownership except to fulfill an outstanding request.

2. The method of claim 1 further comprising the step of:

identifying a memory agent targeted by the outstanding request if there is an outstanding request;

wherein parking one of said plurality of memory agents includes parking the memory agent targeted by the outstanding request.

3. The method of claim 1 wherein the outstanding signal indicates an outstanding READ operation exists.

4. The method of claim 1 wherein the outstanding signal indicates an outstanding WRITE operation exists.

5. A computer system comprising:

a plurality of processor agents;

a plurality of memory agents; and a split transaction bus connecting said processor agents and said memory agents wherein said split transaction bus has an arbiter which determines if there is an outstanding request on the split transaction bus, determines if there is a requesting agent, parks one of said plurality of memory agents if there is an outstanding request and not a requesting agent and parks one of said plurality processor agents if there is not an outstanding request and not a requesting agent, wherein said plurality of memory agents do not generally request bus ownership except to fulfill an outstanding request.

6. In a computer system comprising a plurality of processor agents, specialized memory agents which are likely to request bus access and a split transaction bus having an arbiter, a method of arbitration parking comprising the steps of:

determining if there is a requesting agent; and parking one of the plurality of specialized memory agents which is likely to request bus access if there is not a requesting agent.

7. The method of claim 6 further comprising the step of:

determining if there is an outstanding request on the split transaction bus; and identifying a memory agent targeted by the outstanding request;

wherein the parking one of the plurality of specialized memory agents includes parking the memory agent targeted by the outstanding request.

8. The method of claim 7 wherein the outstanding signal indicates an outstanding READ operation exists.

9. The method of claim 7 wherein the outstanding signal indicates an outstanding WRITE operation exists.

10. The method of claim 6 wherein at least one of the plurality of specialized memory agents is a memory agent which maintains directory based cache coherency.

11. The method of claim 6 wherein at least one of the plurality of specialized memory agents is a memory agent which acts as a bridge to at least one other bus.

12. A computer system comprising:

a plurality of processor agents;

a plurality of specialized memory agents which are likely to request bus access; and a split transaction bus connecting said processor agents and said memory agents wherein said split transaction bus has an arbiter which parks one of said memory agents when there is an outstanding request or when there is not a processor agent or specialized memory agent request.

13. In a computer system comprising a plurality of processor agents, a single specialized memory agent which is likely to request bus access and a split transaction bus having an arbiter, a method of arbitration parking comprising the step of:

continually parking the single memory agent which is likely to request bus access if there is not a requesting agent.

* * * * *